(12) United States Patent
Sakai et al.

(10) Patent No.: US 7,346,377 B2
(45) Date of Patent: Mar. 18, 2008

(54) FOLDING MECHANISM AND ELECTRONIC APPARATUS USING THE SAME

(75) Inventors: Koji Sakai, Fukui (JP); Masaki Nakase, Fukui (JP); Yasuchika Kudo, Fukui (JP); Takehiko Konja, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 447 days.

(21) Appl. No.: 10/810,213

(22) Filed: Mar. 26, 2004

(65) Prior Publication Data

US 2004/0224730 A1 Nov. 11, 2004

(30) Foreign Application Priority Data

Apr. 10, 2003 (JP) ............................. 2003-106404

(51) Int. Cl.
*H04M 1/00* (2006.01)
*E05F 1/08* (2006.01)
*E05D 11/10* (2006.01)

(52) U.S. Cl. .............................. 455/575.3; 455/575.1; 16/303; 16/330; 379/433.11; 379/433.13

(58) Field of Classification Search .. 455/575.1–575.3, 455/575.4, 575.8; 379/433.11–433.13; 16/303, 16/330
See application file for complete search history.

(56) References Cited

U.S. PATENT DOCUMENTS 6,658,111 B2 * 12/2003 Nagashima ............ 379/433.13

6,886,221 B2 * 5/2005 Minami et al. ................ 16/324

FOREIGN PATENT DOCUMENTS

| JP | 11030226 A | * | 2/1999 |
| JP | 11050735 A | * | 2/1999 |
| JP | 2000017932 A | * | 1/2000 |
| JP | 2000-192939 A | | 7/2000 |
| JP | 2000192939 A | * | 7/2000 |
| JP | 2002118633 A | * | 4/2002 |
| JP | 2002171319 A | * | 6/2002 |
| JP | 2002-209000 A | | 7/2002 |

* cited by examiner

*Primary Examiner*—Lester G. Kincaid
*Assistant Examiner*—Matthew C Sams
(74) *Attorney, Agent, or Firm*—RatnerPrestia

(57) ABSTRACT

To provide a folding mechanism capable of securely holding its opened and closed positions and an electronic apparatus employing the same. The folding mechanism is constructed by disposing outer circumferential fixed cam on the outer circumferential side and inner circumferential fixed cam on the inner circumferential side of a side surface of fixed member and, further, disposing outer circumferential movable cam on the outer circumferential side and inner circumferential movable cam on the inner circumferential side of a side face of movable member in confronting relation with the fixed cams.

5 Claims, 9 Drawing Sheets

FOLDING MECHANISM AND ELECTRONIC APPARATUS USING THE SAME

FIELD OF THE INVENTION

The present invention relates to a folding mechanism for use in various electronic apparatuses such as a mobile telephone and miniature personal computer and an electronic apparatus using the same.

BACKGROUND OF THE INVENTION

Recently, there have been made great advancement in production of high performance electronic apparatuses such as mobile telephones and personal computers and variety of those apparatuses have been increased. In accordance therewith, such apparatuses having a movable housing arranged to be opened and closed with respect to a fixed housing, i.e., apparatuses of folding type, and those having a movable housing capable of swiveling around a swivel axis in addition to the above mentioned folding around a hinge axis are increasing in number. One of the examples of the apparatuses mentioned just above is disclosed in Japanese Laid-open Patent Publication No. 2002-209000.

Such apparatuses are desired to provide a good feel in folding operation and also to hold the opened and closed positions securely.

A conventional folding mechanism of the described type and an electronic apparatus using the mechanism will be described with reference to FIG. 6 to FIG. 10.

In a sectional view of the drawings, the dimension is shown elongated in the radial direction to make easy the understanding of the relationship between a fixed cam and a movable cam.

FIG. 8 and FIG. 9 is a sectional view and an exploded view in perspective of a conventional folding mechanism.

Fixed member 1 in a substantially cylindrical shape having a hollowed portion in its center is provided with a pair of fixed cams 2A and 2B in symmetrical positions 180° apart from each other on the circumference of its left-hand side face.

Further, movable member 3 in a substantially cylindrical shape is arranged for rotation in opening and closing directions with respect to fixed member 1. Movable member 3 is provided with a pair of movable cams 4A and 4B, each thereof being formed of a protruded portion and sloped portions extended therefrom toward the left and right, disposed in symmetrical positions 180° apart from each other on the circumference of its right-hand side face in confronting relation with fixed cams 2A and 2B.

Further, in a space between fixed member 1 and cover 5 which is formed in a substantially disk shape, there is mounted coil spring 6 as weakly precompressed. Urged by spring 6, tip ends of fixed cams 2A and 2B are held in resilient contact with the sloped portions of movable cams 4A and 4B, respectively. Further, there is provided movable shaft 7 in a substantially circular pillar shape having its left end portion fixedly attached to movable member 3 and having its right end portion, past through the hollowed portion in fixed member 1 and spring 6, in engagement with cover 5.

Further, mount portion 3A of movable member 3 is arranged to rotatably stick out of opening 8A at the left-hand end of fixed case 8 in a substantially cylindrical shape and protrusion 1A of fixed member 1 is inserted in groove portion 8B provided on its inner periphery. Thus, fixed member 1 is housed in fixed case 8 for movement in the axial direction. Further, while swivel axis 8C is disposed on the under side of fixed case 8, an opening at the right-hand end of fixed case 8 is covered with cover 5.

Folding mechanism 10 is thus constructed with fixed member 1, movable member 3, spring 6, and the like housed in fixed case 8.

Swivel axis 8C on the under side of fixed case 8 of folding mechanism 10 is rotatably mounted on support shaft 12C of fixed housing 12 as shown, for example, in the perspective view of a mobile telephone of FIG. 6B.

On the upper side of fixed housing 12, there are formed operating portion 12A made up of a plurality of keys and voice input portion 12B made up of such members as a microphone.

Further, mount portion 3A of movable member 3 is fixedly attached to movable housing 13 having display portion 13A formed of LCD and the like and voice output portion 13B formed of a speaker and the like disposed on the surface thereof. Thus, the electronic apparatus is constructed by having movable housing 13 hingedly supported by folding mechanism 10 for opening and closing with respect to fixed housing 12 and, further, by having movable member 13 supported by swivel axis 8C for swiveling around the same.

Operations of the folding mechanism configured as above and an electronic apparatus employing the same will be described with reference to sectional views of main portions of FIG. 10A to FIG. 10C.

In reality, a plurality of fixed cams 2A and 2B, as well as a plurality of movable cams 4A and 4B, are three-dimensionally disposed in symmetrical positions on the circumferences of the left-hand side face of fixed member 1 and the right-hand side face of movable member 3 which are both substantially cylindrical. However, the cams are shown two-dimensionally developed in FIG. 10A to FIG. 10C to make movements of these components easy to understand.

In the first place, FIG. 10A shows a state in which the tip ends of fixed cam 2A and fixed cam 2B in symmetrical positions therewith at an interval of 180° are in resilient contact with sloped portions on the left-hand sides of movable cams 4A and 4B, respectively. In this state, movable member 3 is urged by spring 6 via fixed member 1 to move in the closing direction toward the right. As a result, movable housing 13 having mount portion 3A of folding mechanism 10 fixedly attached thereto is held in a closed state with respect to fixed housing 12. FIG. 6A shows the above closed state.

Then, from this closed state, movable housing 13 is opened by hand as shown by the arrow in FIG. 6B. As shown in FIG. 10B, this state corresponds to a state reached by movable member 3 turning leftward and fixed member 1 moving upward with spring 6 further compressed, thereby allowing tip ends of fixed cams 2A and 2B to go over the protrusions of movable cams 4A and 4B and come into resilient contact with the sloped portions on their right-hand side. As a result, movable member 3 is urged in the opening direction toward the left and, hence, a force in the opening direction is applied to movable housing 13.

Further, as shown in FIG. 10C, according as the tip ends of fixed cams 2A and 2B slide on the sloped portions on the right-hand side of movable cams 4A and 4B while being kept in resilient contact therewith, movable housing 13 comes to open wider. And, when fixed cam 2A comes into resilient contact with the flat portion at the end of the sloped portion, i.e., on the left-hand side of movable cam 4B, and when fixed cam 2B comes into resilient contact with the flat portion on the left-hand side of movable cam 4A, which are symmetrically positioned 180° apart from each other, movable housing 13 comes to be held open as wide as approximately 180° from its closed position.

In other words, since fixed cams 2A and 2B and movable cams 4A and 4B are each provided in symmetrical positions 180° apart from each other on the circumferences of the side faces of fixed member 1 and movable member 3, movable housing 13 can be opened as wide as approximately 180°. However, conventional folding mechanism 10 is arranged not to open wider than that.

Further, in the state where movable housing 13 is opened approximately 180°, the tip ends of fixed cams 2A and 2B are in resilient contact with the flat portions on the left-hand side of movable cams 4A and 4B. Hence, movable member 3, i.e., movable housing 13, is in such a state that substantially no force is applied thereto in the opening direction.

Further, when movable housing 13 is swiveled as shown in the perspective view of FIG. 7A with movable housing 13, shown in FIG. 6A, kept closed, movable housing 13 is pivoted on supporting shaft 12C of fixed housing 12. Then, while operating portion 12A faces the operator, display portion 13A has its back toward the operator.

Further, in this state, folding mechanism 10 is in its closed state, i.e., in the state as shown in FIG. 10A, where the tip ends of fixed cams 2A and 2B are in resilient contact with the sloped portions on the left-hand side of movable cams 4A and 4B, respectively.

If movable housing 13 in such a state is folded down to be closed, with display portion 13A kept face up as shown in FIG. 7B, folding mechanism 10 itself is then comes into the same state as is brought about when movable housing 13 is opened to around 180° from its closed state as described above. Thus, as shown in FIG. 10C, the state in which the tip ends of fixed cams 2A and 2B are in resilient contact with the flat portions on the left-hand side of movable cams 4A and 4B and movable housing 13 is folded down is brought about.

However, in the described state, substantially no force in the opening direction is applied to movable member 3 as described above, and hence, substantially no force in the closing direction is applied to movable housing 13.

Thus, angle of opening over 180° cannot be attained by the above described conventional folding mechanism. Further, substantially no force in the closing direction is applied to movable housing 13 in the state of movable housing 13 folded down with display portion 13A face up, i.e., in the state of folding mechanism 10 opened approximately 180° from its closed position.

As a result, there arises a problem in an electronic apparatus employing such conventional folding mechanism 10 that a gap or play tends to be produced between movable housing 13 and fixed housing 12 and it becomes difficult to hold the opened and closed positions securely.

On the other hand, if such a configuration is made that has a single fixed cam and a single movable cam to come into resilient contact with each other, instead of such that has a plurality of fixed cams and movable cams in symmetrical positions 180° apart from each other to come into resilient contact as described above, a folding mechanism capable of attaining an angle of opening wider than 180° can be realized.

In such case, however, since resilient contact between cams is made only in one position, each cam tends to incline from its right position and the inclined cam tends to come into abutment with the movable shaft. As a result, wear and tear are liable to be produced. Further, a problem arises that it becomes difficult to obtain opening and closing operations felt good and kept stabilized.

The present invention was made to overcome such problems of the prior art. Accordingly, the invention is directed to provision of a folding mechanism in which opening and closing operations are made with a good feel and opened and closed positions are securely held, as well as to provision of an electronic apparatus employing the same.

SUMMARY OF THE INVENTION

To provide a folding mechanism which comprises: a fixed member having a plurality of fixed cams disposed on a side face thereof; a movable member arranged for rotation with respect to the fixed member having a plurality of movable cams disposed on a side face thereof in confronting relation with the fixed cams; and a spring for urging the movable member or the fixed member so that the movable cams and the fixed cams are brought into resilient contact with each other; in which one of the plurality of fixed cams and movable cams are disposed on the outer circumferential side and the other of the cams are disposed on the inner circumferential side.

DETAILED DESCRIPTION OF THE EXEMPLARY EMBODIMENTS

Figure 1:
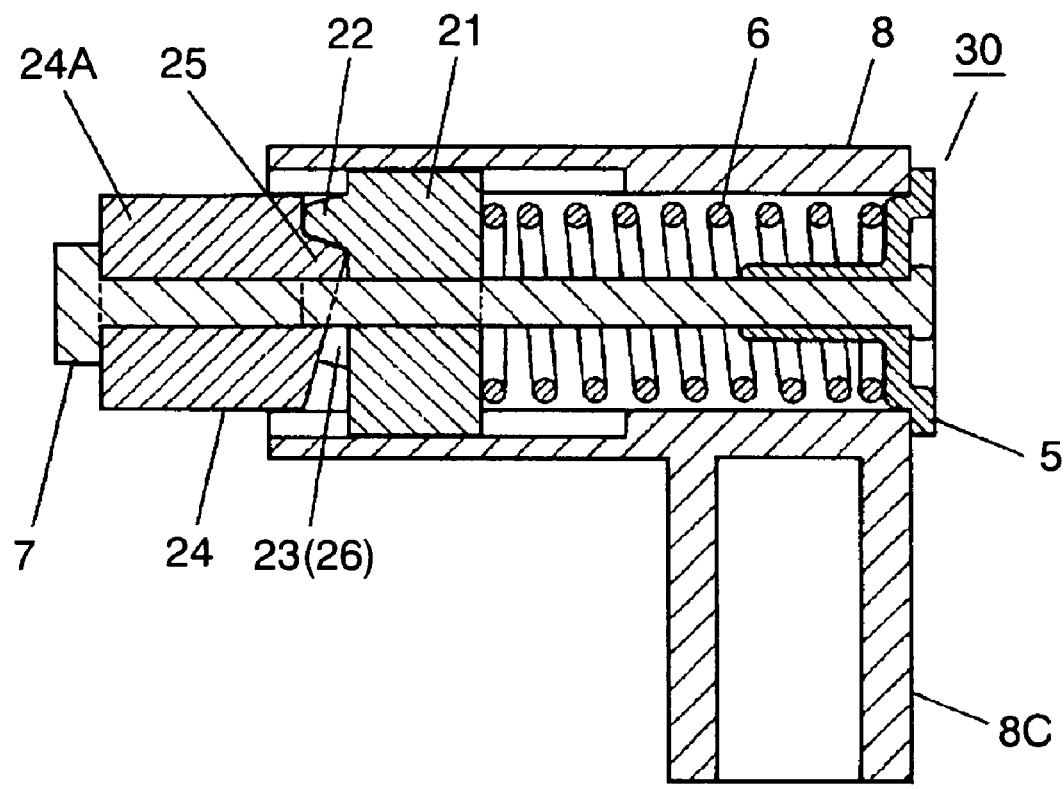
FIG. 1 is a sectional view of a folding mechanism according to an embodiment of the present invention.

An exemplary embodiment of the present invention will be described below with reference to FIG. 1 to FIG. 7. Incidentally, the drawings are just schematic views and not that showing each position exactly. Further, corresponding components to those of the configurations described in the background art are denoted by like reference numerals and detailed description of the same will be omitted.

Further, in the sectional view in the drawings, dimensions in the radial direction are shown increased to make the relationship between the fixed cam and the movable cam easy to understand.

Exemplary Embodiment

Figure 2:
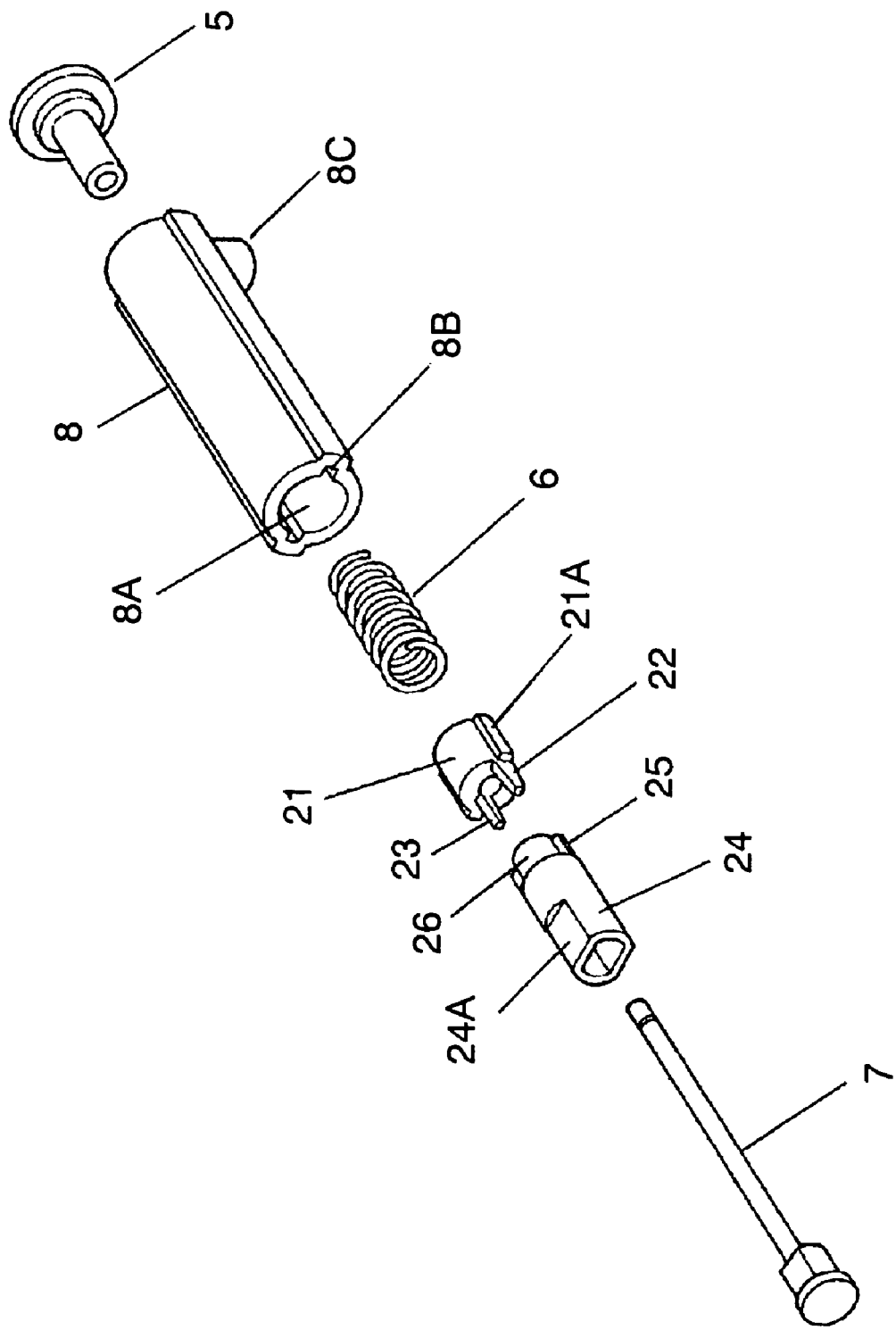
FIG. 2 is an exploded view in perspective of the folding mechanism according to the embodiment of the present invention.
Figure 3:
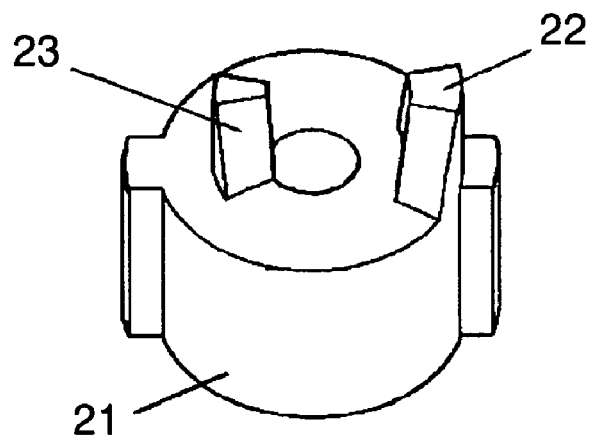
FIG. 3 is a perspective view of a fixed member of the folding mechanism according to the embodiment of the present invention.

In the first place, fixed member 21 and movable member 24 will be described with reference to FIG. 1 to FIG. 4. As shown in FIG. 1 and FIG. 2, fixed member 21 made of a metal such as copper or copper alloy in a substantially hollowed cylindrical shape is provided with outer circumferential fixed cam 22 disposed on the outer circumferential side of its left-hand side face and is also provided with inner circumferential fixed cam 23 disposed at a symmetrical position an angle of 180° apart therefrom on the inner circumferential side. FIG. 3 is a perspective view of fixed member 21.

Figure 4:
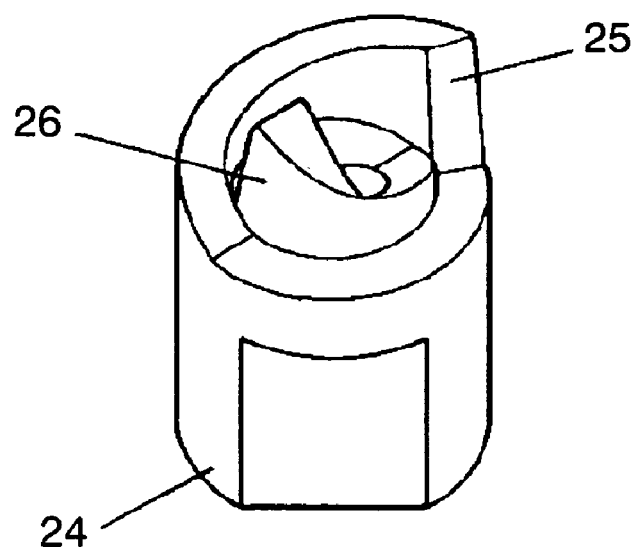
FIG. 4 is a perspective view of a movable member of the folding mechanism according to the embodiment of the present invention.

Further, there is provided movable member 24 similarly made of a metal in a substantially cylindrical shape arranged for rotation in the opening and closing direction with respect to fixed member 21. Movable member 24 is provided with outer circumferential movable cam 25 formed of a protruded portion and sloped portions extended to the left and right disposed on the outer circumferential side of its right-hand side face, in confronting relation with outer circumferential fixed cam 22, and is also provided with inner circumferential movable cam 26, similarly formed of a protruded portion and sloped portions disposed at a symmetrical position with outer circumferential movable cam 25 on the inner circumferential side, in confronting relation with inner circumferential fixed cam 23. FIG. 4 is a perspective view of movable member 24.

Further, as shown in FIG. 1, fixed member 21 is urged by weakly precompressed coil spring 6 mounted between fixed member 21 and disk-shaped cover 5. Consequently, the tip end of outer circumferential fixed cam 22 of fixed member 21 is held in resilient contact with the sloped portion of outer circumferential movable cam 25 and the tip end of inner circumferential fixed cam 23 is held in resilient contact with the sloped portion of inner circumferential movable cam 26.

Further, there is provided movable shaft 7 in a substantially circular pillar shape having its left end portion fixedly attached to movable member 24 and having its right end portion, past through the hollowed portion in fixed member 21 and spring 6, in engagement with cover 5.

As shown in FIG. 2, mount portion 24A of movable member 24 is arranged to rotatably stick out of opening 8A at the left-hand end of fixed case 8 in a substantially cylindrical hollow shape. Further, protrusion 21A of fixed member 21 is inserted in groove portion 8B provided on the inner periphery of fixed case 8, so that fixed member 21 is housed in fixed case 8 for movement in the axial direction.

On the under side of fixed case 8, there is provided swivel axis 8C and an opening at the right-hand end of fixed case 8 is covered with cover 5. Thus, folding mechanism 30 is constructed by having fixed member 21, movable member 24, spring 6, and the like housed in fixed case 8.

Figure 6A:
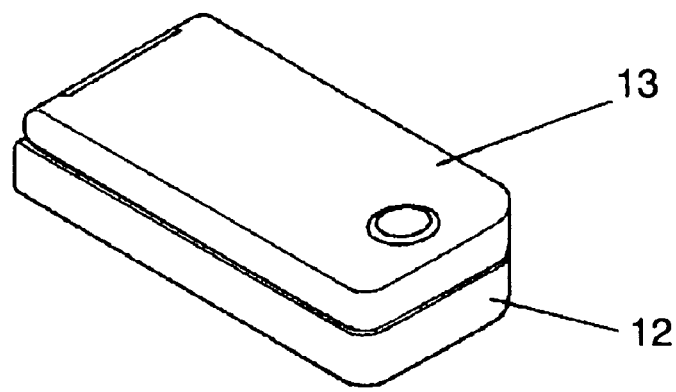
FIG. 6A and FIG. 6B are perspective views of an electronic apparatus in its closed and opened state.
Figure 6B:
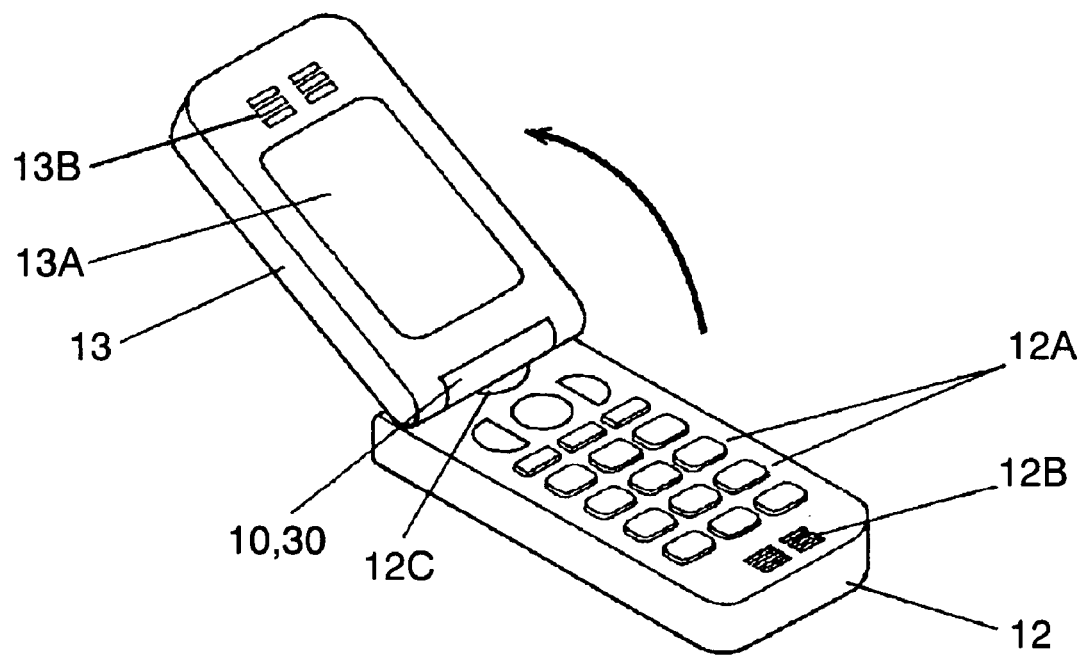

Folding mechanism 30 constructed as described above is set, as shown for example in the perspective view of a mobile telephone of FIG. 6B, in the mobile telephone by having swivel axis 8C on the under side of fixed case 8 rotatably mounted on support shaft 12C of fixed housing 12.

Fixed housing 12 has operating portion 12A formed of a plurality of keys and voice input portion 12B formed of a microphone and the like disposed on its upper face.

Further, movable housing 13 with display portion 13A formed of LCD and the like and voice output portion 13B formed of a speaker and the like disposed on the surface thereof is fixedly attached to mount portion 24A of movable member 24. Thus, by having movable housing 13 hingedly supported by folding mechanism 30 for opening and closing with respect to fixed housing 12 and by having movable housing 13 supported by swivel axis 8C for swiveling around the same, an electronic apparatus is constructed.

Opening and closing operations of the above described folding mechanism and the electronic apparatus employing the same will be described below with reference to FIG. 5A to FIG. 5C.

Figure 5A:
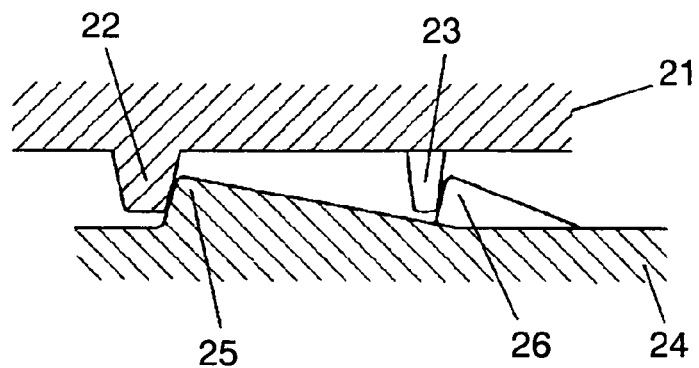
FIG. 5A to FIG. 5C are sectional views of important portions of the folding mechanism according to the embodiment of the present invention.
Figure 5B:
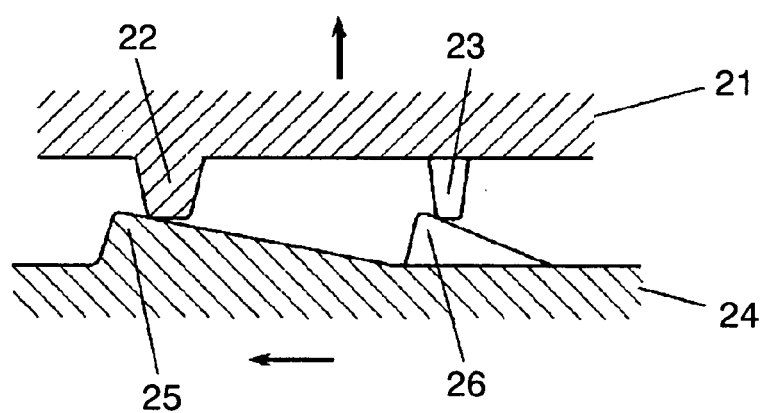
Figure 5C:
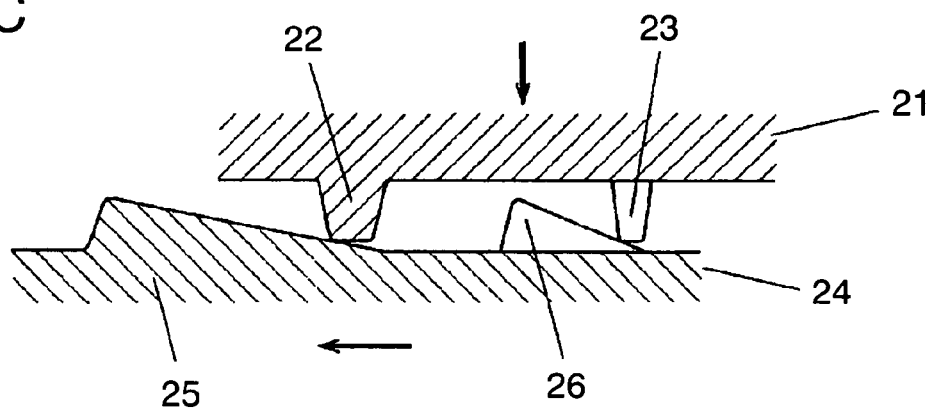

Although, in reality, outer circumferential fixed cam 22 and inner circumferential fixed cam 23, as well as outer circumferential movable cam 25 and inner circumferential movable cam 26, are three dimensionally disposed in symmetrical positions on the circumferences of the left-hand side face of fixed member 21 and the right-hand side face of movable member 24 formed in a substantially cylindrical shape, they are shown two dimensionally developed in FIG. 5A to FIG. 5C to make movements of the relative components easy to understand.

First, as shown in FIG. 5A, the tip end of outer circumferential fixed cam 22 on the outer circumferential side is placed in resilient contact with the sloped portion on the left-hand side of outer circumferential movable cam 25. At the same time, the tip end of inner circumferential fixed cam 23 on the inner circumferential side is placed in resilient contact with the sloped portion on the left-hand side of inner circumferential movable cam 26, in the symmetrical position with fixed cam 22 and with movable cam 25 at an angle of 180°. In this state, movable member 24 is urged by spring 6 via fixed member 21 to move in the closing direction toward the right. Consequently, movable housing 13 securely fixed with mount portion 24A of folding mechanism 30 is held closed with respect to fixed housing 12 as shown in FIG. 6A.

Then, movable housing 13 is opened as shown in FIG. 6B by hand from the closed state. At this time, movable member 24 securely fixed to movable housing 13 is rotated leftward and, meanwhile, fixed member 21 is moved upward causing spring 6 to be compressed further. Then, tip ends of outer circumferential fixed cam 22 and inner circumferential fixed cam 23, past over the protrusions of outer circumferential movable cam 25 and inner circumferential movable cam 26, are brought into resilient contact with the sloped portion on their right-hand side. As a result, since movable member 24 is urged in the leftward opening direction, a force in the opening direction is applied to movable housing 13.

As shown in FIG. 5C, according as the tip ends of outer circumferential fixed cam 22 and the inner circumferential fixed cam 23 are slid along the sloped portions on the right hand side of outer circumferential movable cam 25 and inner circumferential movable cam 26 in resilient contact therewith, movable housing 13 is opened wider. Thus, even if an angle of opening over 180° from the closed position is attained, a force to open movable housing 13 still further is applied to movable housing 13. Incidentally, in order to hold movable housing 13 at the position where it is opened approximately 180°, a stopper or the like abutting on fixed housing 12 may be provided on the under end of movable housing 13. In the described manner, while outer circumferential fixed cam 22 and outer circumferential movable cam 25 are disposed on the outer circumferential side, inner circumferential fixed cam 23 and inner circumferential movable cam 26 are disposed on the inner circumferential side, i.e., their respective sliding positions along the slopes, in resilient contact therewith, are made radially different. In the describe manner, movable housing 13 is arranged, even if it is opened wider than 180°, to be urged to open still wider.

Further, by the provision of outer circumferential fixed cam 22 and inner circumferential fixed cam 23, as well as outer circumferential movable cam 25 and inner circumferential movable cam 26, in symmetrical positions approximately 180° apart from each other, load of spring 6 is evenly applied to each pair of cams so that the cams can be prevented from inclining or producing plays.

Figure 7A:
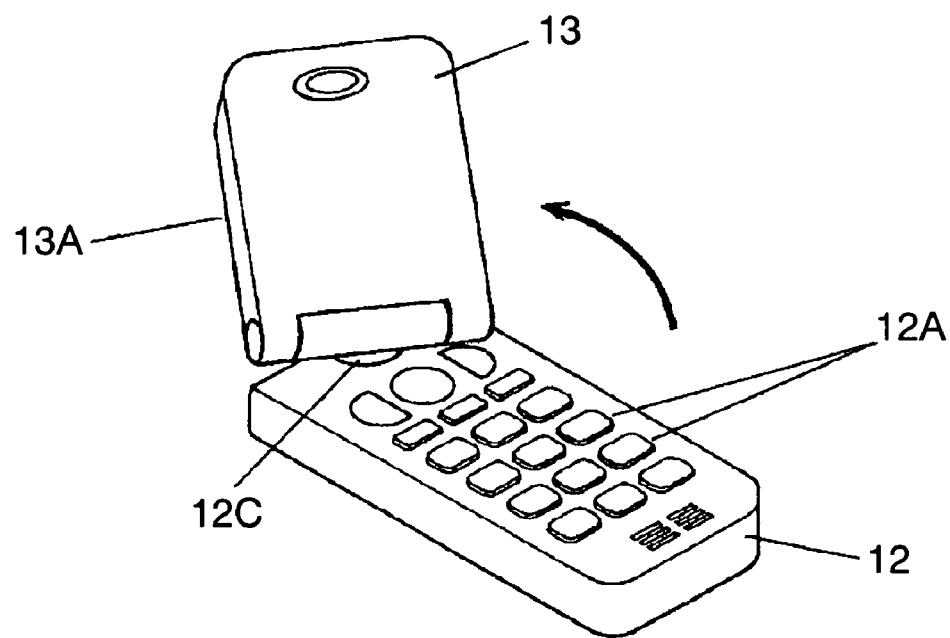
FIG. 7A and FIG. 7B are perspective views of an electronic apparatus in which a swivel motion has been made.

Further, when movable housing 13 is swiveled as shown in the perspective view of FIG. 7A with movable housing 13 shown in FIG. 6A kept closed, movable housing 13 is pivoted on supporting shaft 12C of fixed housing 12. Then, while operating portion 12A faces the operator of the electronic apparatus, display portion 13A has its back toward the operator.

Further, in this state, folding mechanism 30 is in its closed state, i.e., in the state as shown in FIG. 5A where the tip ends of outer circumferential fixed cam 22 and inner circumferential fixed cam 23 are in resilient contact with the sloped portions on the left hand side of outer circumferential movable cam 25 and inner circumferential movable cam 26, respectively.

If, from the described state, movable housing 13 is folded together with display portion 13A held face up, folding mechanism 30 itself is brought to the same state in which it is opened from its closed state to an angle of substantially 180°. And, as shown in FIG. 5C, the tip ends of outer circumferential fixed cam 22 and inner circumferential fixed cam 23 come into resilient contact with the sloped portions on the right-hand side of outer circumferential movable cam 25 and inner circumferential movable cam 26, so that movable member 24 is urged in the direction to open wider than 180°.

Figure 7B:
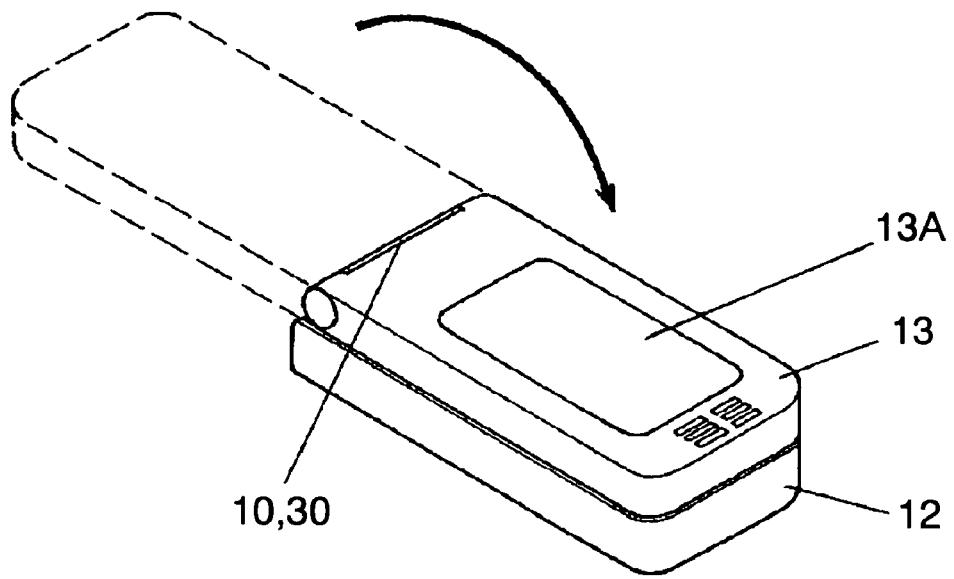
Figure 8:
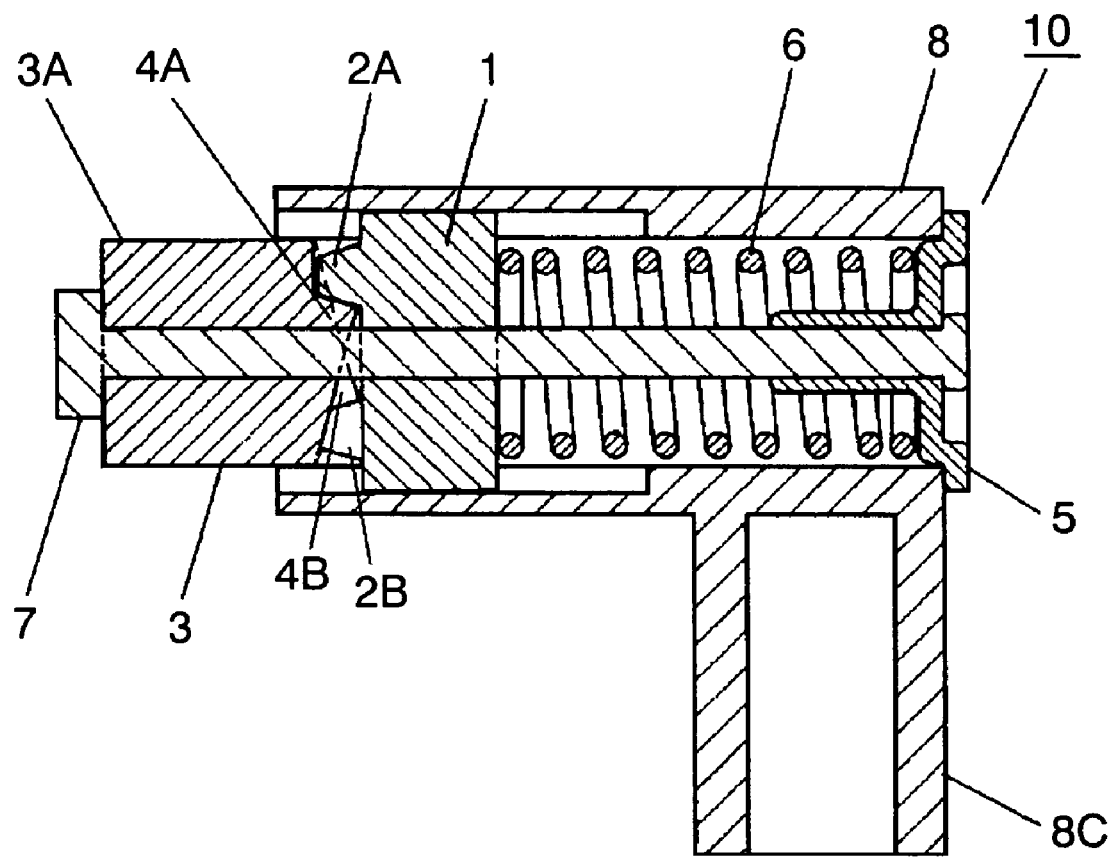
FIG. 8 is a sectional view of a prior art folding mechanism.
Figure 9:
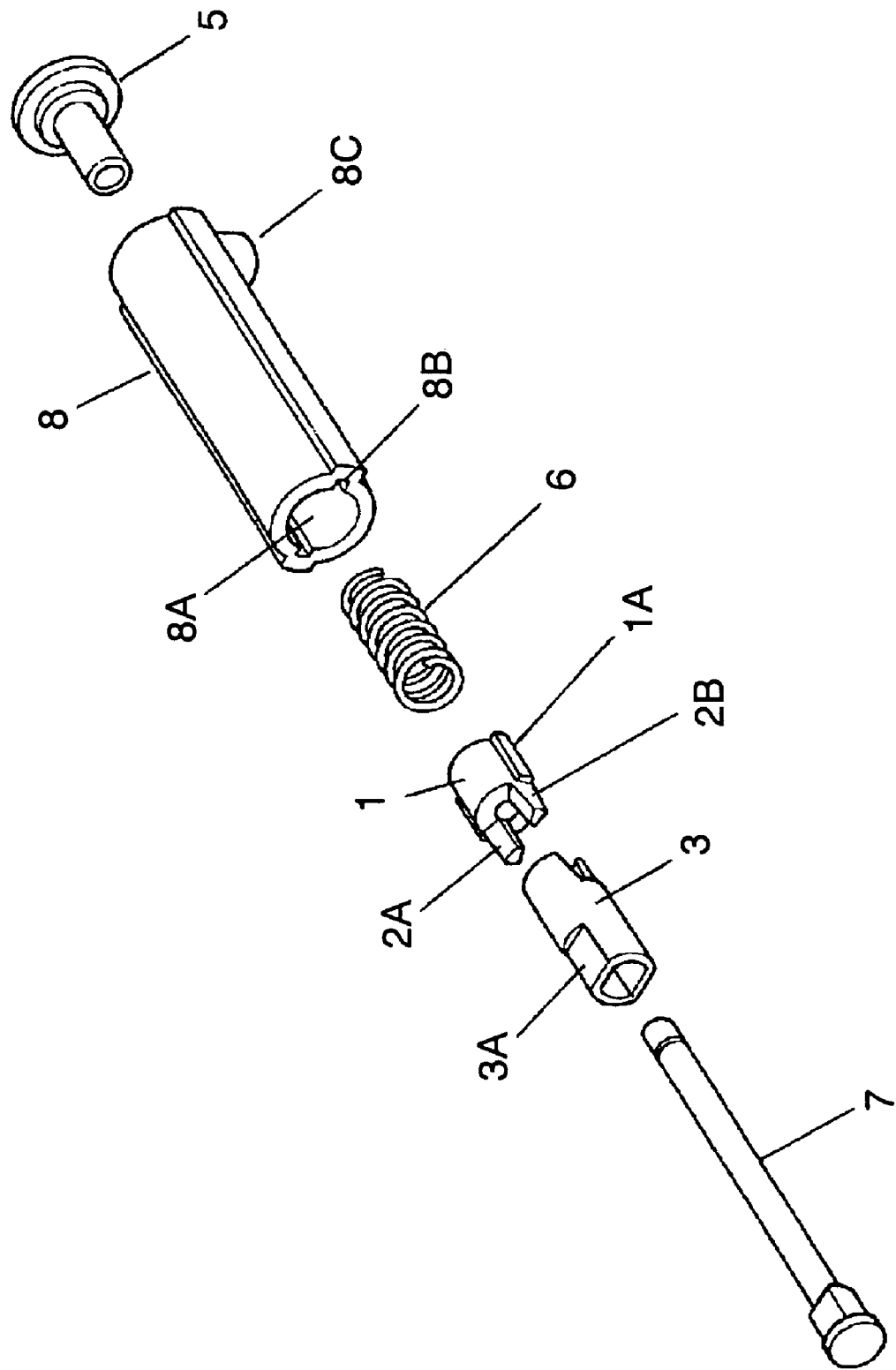
FIG. 9 is an exploded view in perspective of the prior art folding mechanism.
Figure 10A:
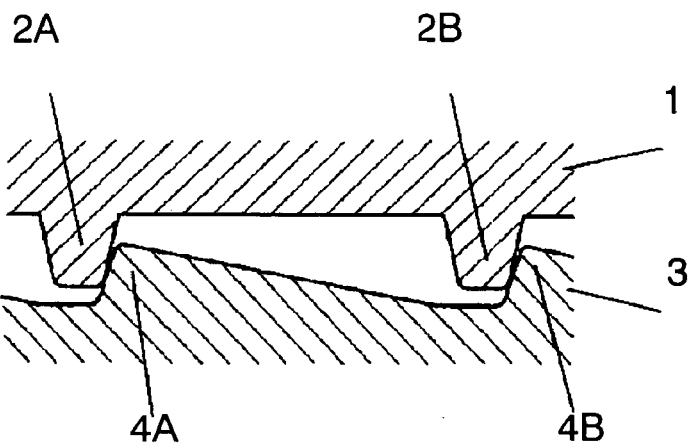
FIG. 10A to FIG. 10C are sectional views of important portions of the prior art folding mechanism.
Figure 10B:
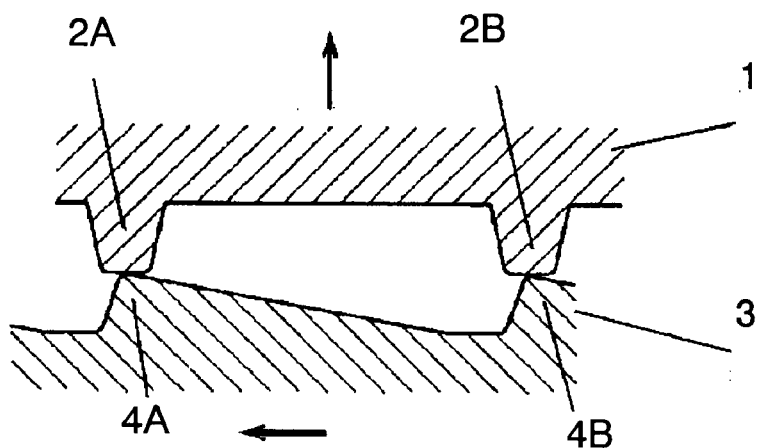
Figure 10C:
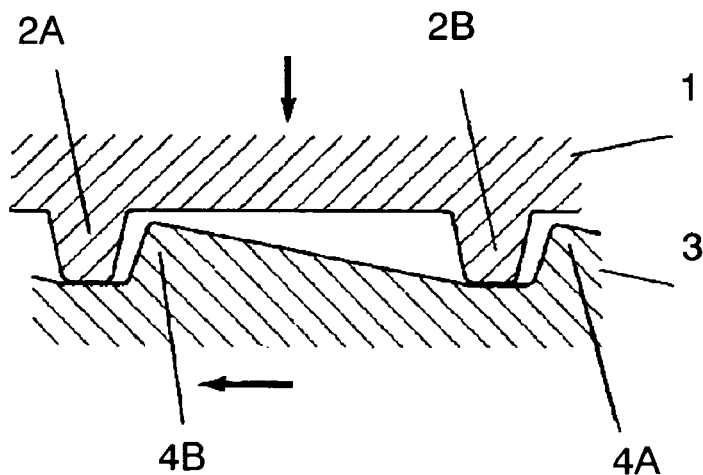

Accordingly, in the state shown in FIG. 7B, movable housing 13 is subjected to a force in the direction to close it, i.e., to fold it down. Therefore, movable housing 13 and fixed housing 12 can be securely folded together without producing any gap or play therebetween.

According to the present embodiment, the folding mechanism is constructed by disposing outer circumferential fixed cam 22 on the outer circumferential side of fixed member 21 and inner circumferential fixed cam 23 on the inner circumferential side of fixed member 21 and by disposing outer circumferential movable cam 25 on the corresponding outer circumferential side of movable member 24 and inner circumferential movable cam 26 on the corresponding inner circumferential side of movable member 24. Thus, movable housing 13 can be opened to an angle wider than 180°. Further, even in this state, movable member 24 is urged in the direction to be opened still wider. Hence, a folding mechanism capable of securely holding the opened position as well as the closed position and an electronic apparatus using the same can be provided.

Further, outer circumferential fixed cam 22 and inner circumferential fixed cam 23, as well as outer circumferential movable cam 25 and inner circumferential movable cam 26, are each disposed in symmetrical positions.

Hence, inclination of cams can be prevented and opening and closing operations of the folding mechanism can be stabilized and occurrence of wear and tear can be reduced.

In the description made above, such a configuration has been described in which two pairs of cams, i.e., outer circumferential fixed cam 22 and outer circumferential movable cam 25, as well as inner circumferential fixed cam 23 and inner circumferential movable cam 26, are arranged to slide in resilient contact with each other.

In other cases where the folding mechanism has a large dimension in the radial direction, additional cams may be formed on the outer circumferential side or on the inner circumferential side to provide three or four pairs of cams coming into resilient contact with each other. Thus, an urging force applied to the movable member can be obtained at each of predetermined rotated positions. Further, such an effect can be obtained that inclination of cams is prevented and occurrence of wear and tear is reduced.

In the present embodiment, only the case where movable housing 13 is opened and closed by hand and thereby movable member 24 fixedly attached thereto is moved in the opening and closing directions has been described.

Similar effects can be obtained if the folding mechanism is provided with such parts as a pushbutton and a reversing cam to reverse the point of resilient contact so that movable housing 13 can be opened from its closed state by a so-called one-push-open system, in addition to the described opening and closing operation by hand.

By mounting the fixed member and the movable member of the folding mechanism according to the present embodiment to a fixed housing and a movable housing, respectively or vice versa, of which one is a fixed housing of an electronic apparatus having at least one of an operating portion or a voice input portion provided thereon and the other is a movable housing having at least one of a display portion or a voice output portion of the electronic apparatus, an electronic apparatus in which opening and closing positions is securely held can be realized.

As described in the foregoing, the present invention can provide a folding mechanism giving a good feel when it is operated and having the opened and closed positions thereof securely held, and also can provide an electronic apparatus employing the same.

What is claimed is:

1. A folding mechanism comprising:
   a fixed member having a plurality of fixed cams disposed on a side face of the fixed member;
   a movable member arranged for rotation with respect to the fixed member having a plurality of movable cams disposed on a side face of the movable member in confronting relation with the fixed cams, the movable cam being formed of a protruded portion and sloped portions extended to the left and right; and
   a spring for urging the movable member or the fixed member such that the movable cams and the fixed cams are brought into resilient contact with each other;
   wherein
   a first set of the movable and fixed cams form an inner camming unit, and
   a second set of the movable and fixed cams form an outer camming unit positioned circumferentially around the inner camming unit;
   wherein the movable member and the plurality of movable cams are formed solidly; and
   wherein, at a position that the movable cam opens over 180° from a closed position, the fixed cam is held in resilient contact with the sloped portion of the movable cam so that a further force is applied to open the movable cam; and
   wherein each of the plurality of movable cams rotates from a partially open position to a predetermined angle more than 180° from the partially open position without the maximum height of the fixed cams reaching a maximum height of the respective movable cams.

2. The folding mechanism according to claim 1, wherein the plurality of fixed cams and movable cams of the inner and outer camming units are each disposed in symmetrical positions with each other.

3. The folding mechanism according to claim 1, wherein: the inner and outer camming units are disposed on the fixed and movable members at respective inner and outer circumferential portions thereof such that each respective movable or fixed cam is disposed on one of the inner circumferential portion or the outer circumferential portion.

4. An electronic apparatus comprising:

a folding mechanism which comprises a fixed member having a plurality of fixed cams disposed on a side face of the fixed member, a movable member arranged for rotation with respect to the fixed member having a plurality of movable cams disposed on a side face of the movable member in confronting relation with the fixed cams, the movable cam being formed of a protruded portion and sloped portions extended to the left and right, and a spring for urging the movable member or the fixed member so that the movable cams and the fixed cams are brought into resilient contact with each other, wherein a first set of the movable and fixed cams form an inner camming unit, and a second set of the movable and fixed cams form an outer camming unit positioned circumferentially around the inner camming unit;

a fixed housing having at least one of an operating portion and a voice input portion disposed on an upper face thereof; and a movable housing having at least one of a display portion and a voice output portion disposed on a surface;

wherein the fixed member and the movable member are mounted on the fixed housing and the movable housing, respectively or vice versa wherein the movable member and the plurality of movable cams are formed solidly; and wherein, at a position that the movable cam opens over 180° from a closed position, the fixed cam is held in resilient contact with the sloped portion of the movable cam so that a further force is applied to open the movable cam; and wherein each of the plurality of movable cams rotates from a partially open position to a predetermined angle more than 180° from the partially open position without the maximum height of the fixed cams reaching a maximum height of the respective movable cams.

5. The electronic apparatus according to claim 4, wherein:

the inner and outer camming units are disposed on the fixed and movable members at respective inner and outer circumferential portions thereof such that each respective movable or fixed cam is disposed on one of the inner circumferential portion or the outer circumferential portion.

* * * * *

UNITED STATES PATENT AND TRADEMARK OFFICE
CERTIFICATE OF CORRECTION

PATENT NO.        : 7,346,377 B2
APPLICATION NO. : 10/810213
DATED              : March 18, 2008
INVENTOR(S)      : Koji Sakai et al.

It is certified that error appears in the above-identified patent and that said Letters Patent is hereby corrected as shown below:

On the Title Page, Item [56], References Cited, FOREIGN PATENT DOCUMENTS, delete duplicate reference 2000192939 A 7/2000.

Signed and Sealed this

Twenty-ninth Day of July, 2008

JON W. DUDAS
*Director of the United States Patent and Trademark Office*